United States Patent [19]

Gottschalk et al.

[11] 4,158,490

[45] Jun. 19, 1979

[54] BODY-MOUNTED SUPPORT DEVICE FOR MOTION PICTURE CAMERA

[75] Inventors: Robert E. Gottschalk, Los Angeles; Felipe Navarro, Granada Hills; Carl F. Fazekas, Tarzana, all of Calif.

[73] Assignee: Panavision, Incorporated, Tarzana, Calif.

[21] Appl. No.: 807,897

[22] Filed: Jun. 20, 1977

Related U.S. Application Data

[63] Continuation-in-part of Ser. No. 740,781, Nov. 11, 1976, which is a continuation-in-part of Ser. No. 706,196, Jul. 19, 1976.

[51] Int. Cl.$^2$ .............................................. G03B 17/00
[52] U.S. Cl. ..................................... 352/243; 354/82; 224/908; 248/123; 248/183; 248/281; 248/631
[58] Field of Search ................... 352/141, 243; 354/70, 354/81, 82, 294; 248/18, 123, 179, 183, 280, 281, 284, 400; 224/5 R, 5 V

[56] References Cited

U.S. PATENT DOCUMENTS

| 568,977 | 10/1896 | Helmore | 248/400 |
|---|---|---|---|
| 1,971,486 | 8/1934 | Jennings | 352/243 |
| 2,007,215 | 7/1935 | Remey | 352/243 |
| 2,090,439 | 8/1937 | Carwardine | 248/280 |
| 2,552,205 | 5/1951 | Moss | 354/82 |
| 2,962,251 | 11/1960 | Karpf | 352/243 |
| 3,041,060 | 6/1962 | Jacobsen | 248/280 |
| 3,409,261 | 11/1968 | Leporati | 248/284 |
| 3,452,347 | 6/1969 | Stimson | 352/141 |
| 3,767,095 | 10/1973 | Jones | 224/25 A |
| 4,017,168 | 4/1977 | Brown | 352/243 |

Primary Examiner—Monroe H. Hayes
Attorney, Agent, or Firm—Lyon & Lyon

[57] ABSTRACT

A body-mounted support device for a motion picture camera or television camera employs a pair of articulated arm assemblies serially connected and attached to a body harness and positioned to support a gimbal device. A camera support tube is mounted upright to turn on the gimbal device and carries a camera on its upper end, and a battery at its lower end. Two-axis horizontal adjustments are provided for the camera at the top of the support tube. Pneumatic cushion means associated with the articulated arm assemblies dampen unwanted movements of the motion picture camera. Tilt adjustments near a belt portion of the body harness serve to position the camera support tube at the desired position in space in front of the cameraman. Provision is made for right hand or left hand mounting of the arm assemblies. An emergency release mechanism is provided to disconnect the entire device from the body harness. Telescoping parts of the camera support tube enable changes to be made in the center of gravity of the supported assembly, and permit the camera to be operated from a very low elevation with respect to the floor. An improved electronic view finder system is provided.

10 Claims, 10 Drawing Figures

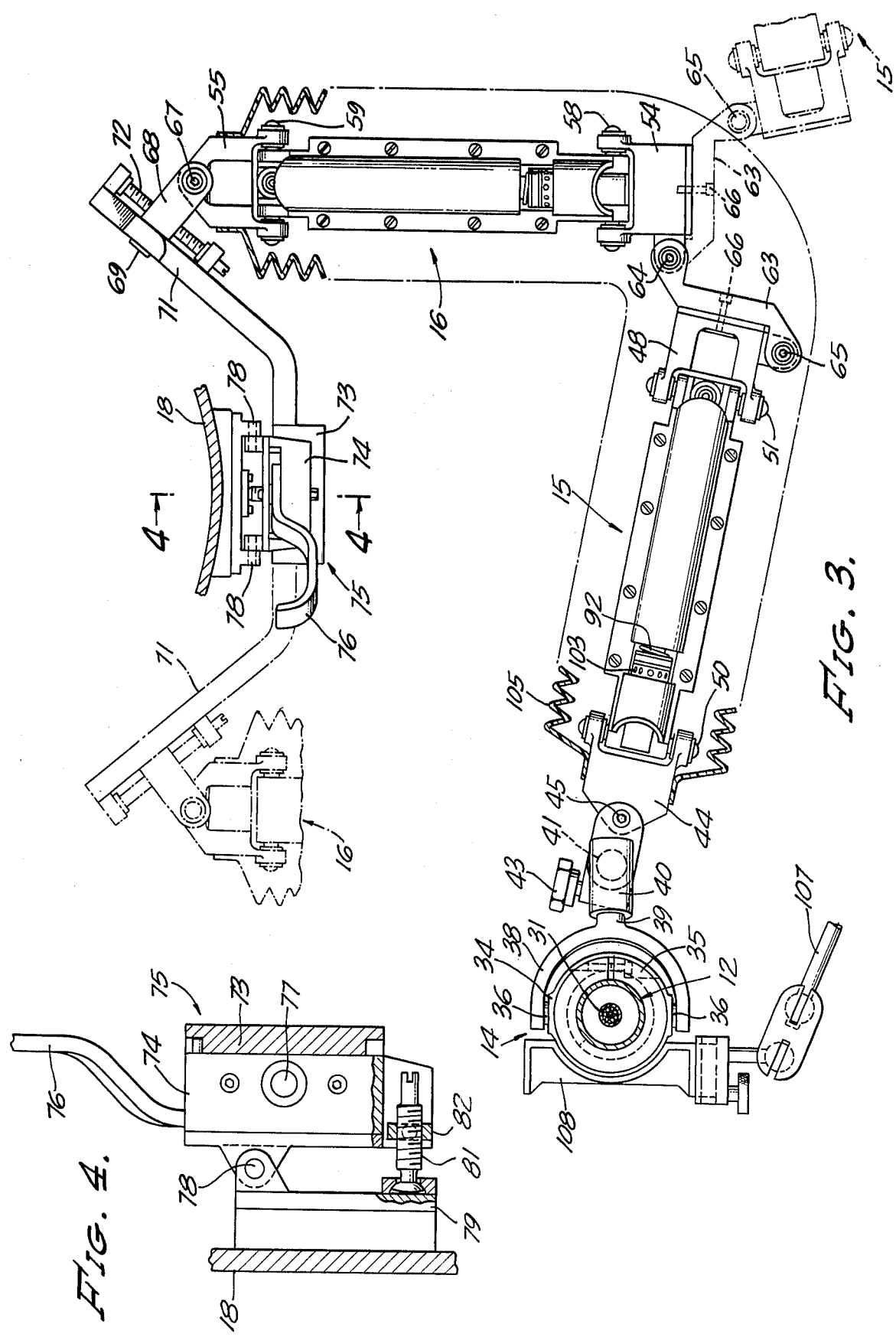

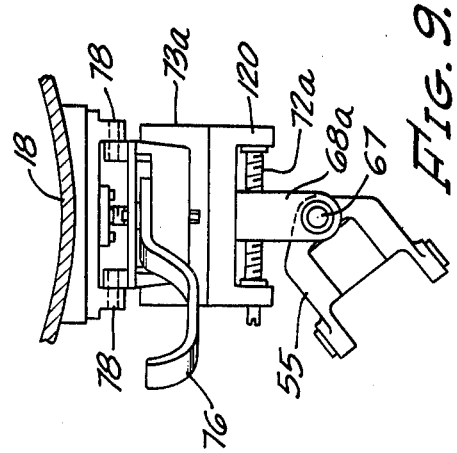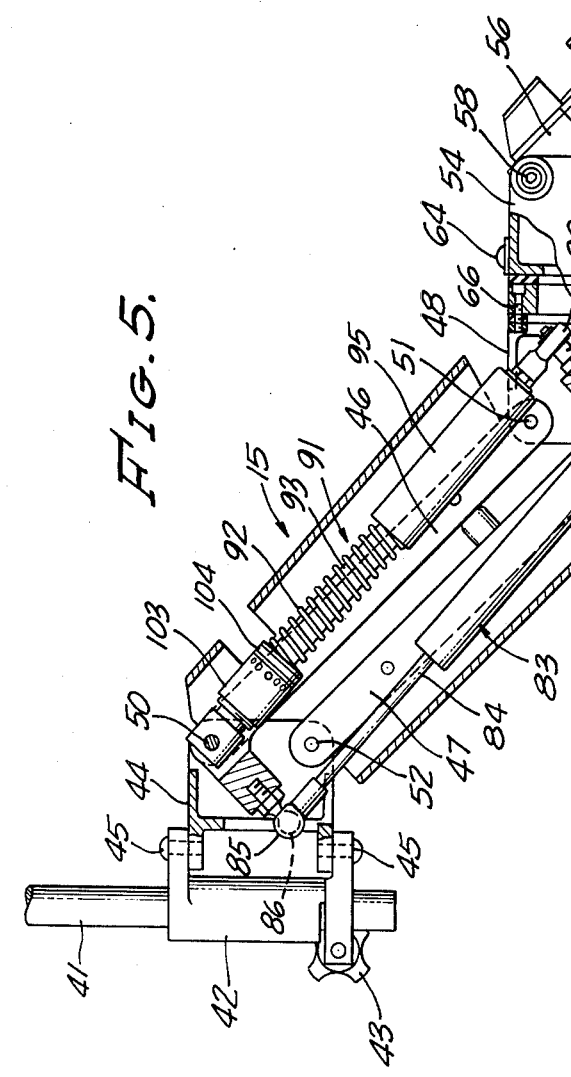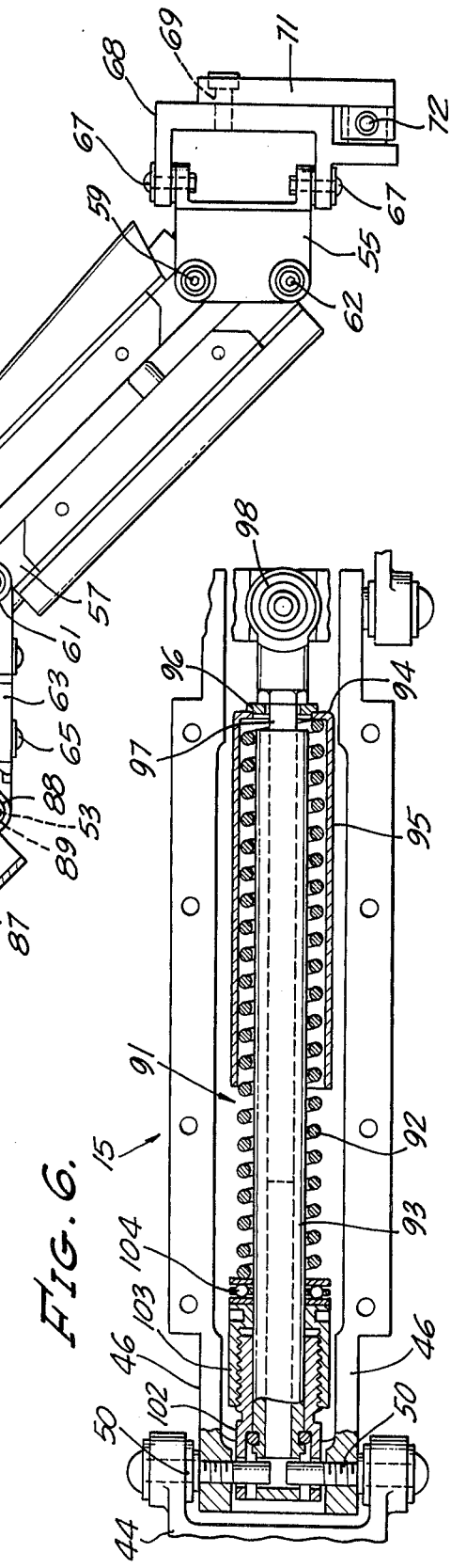

BODY-MOUNTED SUPPORT DEVICE FOR MOTION PICTURE CAMERA

This application is a continuation-in-part of Gottschalk et al Ser. No. 740,781 filed Nov. 11, 1976, which was a continuation-in-part of Gottschalk et al Ser. No. 706,196 filed July 19, 1976.

This invention relates to support devices for professional motion picture or television cameras and is particularly directed to a camera supporting device which may be carried by a cameraman or camera operator or other person, while minimizing the transmission of unwanted movements of the camera. A motion picture camera supported in this manner often eliminates the need for "dolly" shots, and permits the director to obtain unusual photographic effects such as may be obtained by running up a flight of stairs or running along side a moving vehicle or employing the device to steady the camera on a moving platform such as a land vehicle, boat or airplane.

Hand-held motion picture cameras have been used professionally with considerable success, but much depends upon the individual skill and stamina of the camera operator. The device of the present invention relieves the camera operator of the requirement of supporting in his hands the weight of the motion picture camera assembly, and instead causes the weight of the entire device to be carried on a body harness worn by the operator. He may move about while the motion picture camera "floats" in space, and he uses one hand to aim the camera in the desired direction. The camera assembly is mounted at the upper end of a vertical support tube, and the battery and electronic components are carried on the lower end thereof against unwanted movements, by a pendulum effect. The support tube is mounted to turn upon a gimbal device. Articulated arm assemblies with pneumatic cushion devices are serially connected to support the gimbal device upon the body harness.

Two-axis horizontal adjustments are provided for the camera at the top of the support tube. The fore and aft adjustment allows the camera position to be changed when different camera lenses are used, in order to maintain the center of gravity of the supported assembly at or near the axis of the support tube. The support tube itself is made of two telescoping parts so that the height of the center of gravity may be adjusted with relation to the position of the gimbal support. By lifting the lower end of the support tube carrying the battery and electronic components, tilting of the camera for upward or downward shots as well as for lateral swinging about the roll axis may be accomplished by less effort on the part of the camera operator. When maximum steadiness is required, however, the lower end of the support tube is lowered to place the weight of the battery and electronic components at the maximum distance below the gimbal device.

The articulated arm assemblies may be connected for either right hand use or left hand use to accommodate cameramen who are right handed or left handed.

A small video camera may be mounted on a motion picture camera to act as a viewfinder, and a viewing monitor is attached to a ring forming a part of a gimbal device, which ring rotatably supports the camera support tube. Visual indicators on the viewing monitor apprise the cameraman of excessive movement of the camera in either direction about the roll axis. The camera operator may look at the monitor to determine the scene being photographed, even though the camera may be swung in any direction on the ring to pan in a complete circle. An electronic switching circuit is provided so that in the event the cameraman is walking forward while photographing a scene behind him, the image on the monitor screen may be reversed right-for-left to assist the operator in keeping the camera lens aimed in the desired direction.

Other and more detailed objects and advantages will appear hereinafter.

In the drawings:

FIG. 3 is a top plan view showing how the articulated arm assemblies support the gimbal device from the center portion of the body harness belt.

FIG. 4 is a sectional detail taken substantially on the lines 4—4 as shown in FIG. 3.

FIG. 5 is a side elevation partly in section showing the articulated arm assemblies.

FIG. 6 is a sectional plan view of a portion of the device shown in FIG. 5, a top cover being removed.

FIG. 9 is a plan view showing a modification.

Figure 1:
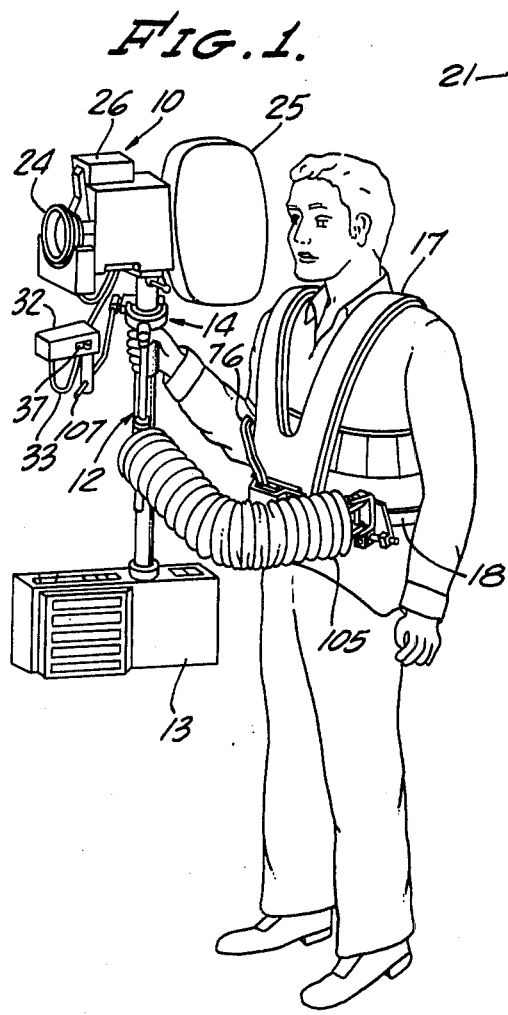
FIG. 1 is a perspective side elevation showing a preferred embodiment of this invention.

Referring to the drawings, a motion picture camera assembly generally designated 10 is mounted on a free-floating support mechanism 11 which includes a camera support tube member 12, battery carrier 13, gimbal device 14, a pair of articulated arm assemblies 15 and 16, and a body harness 17 which includes a belt 18. The body harness 17 and belt 18 are proportioned to be worn by a person such as a cameraman or a camera operator.

Figure 2:
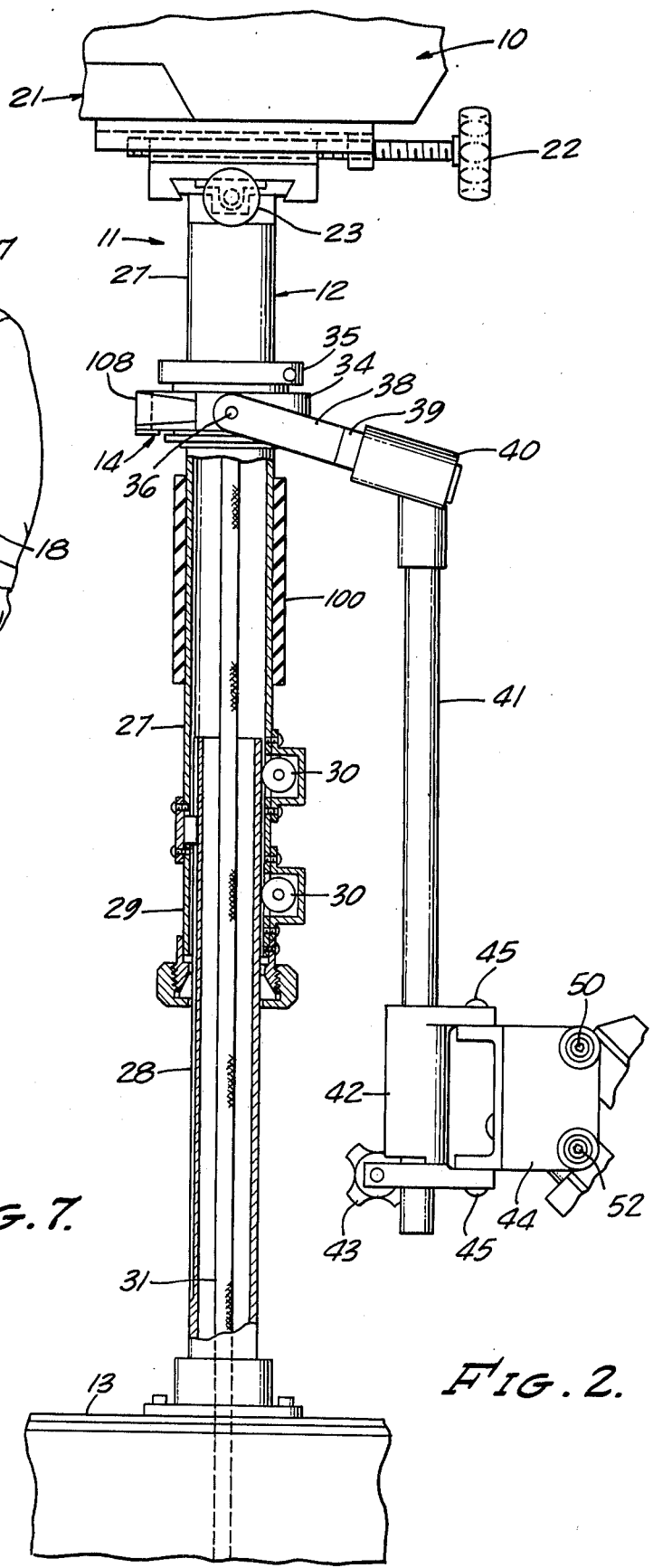
FIG. 2 is a sectional side elevation showing the telescopic parts of the camera support tube for supporting the motion picture camera member.
Figure 10:
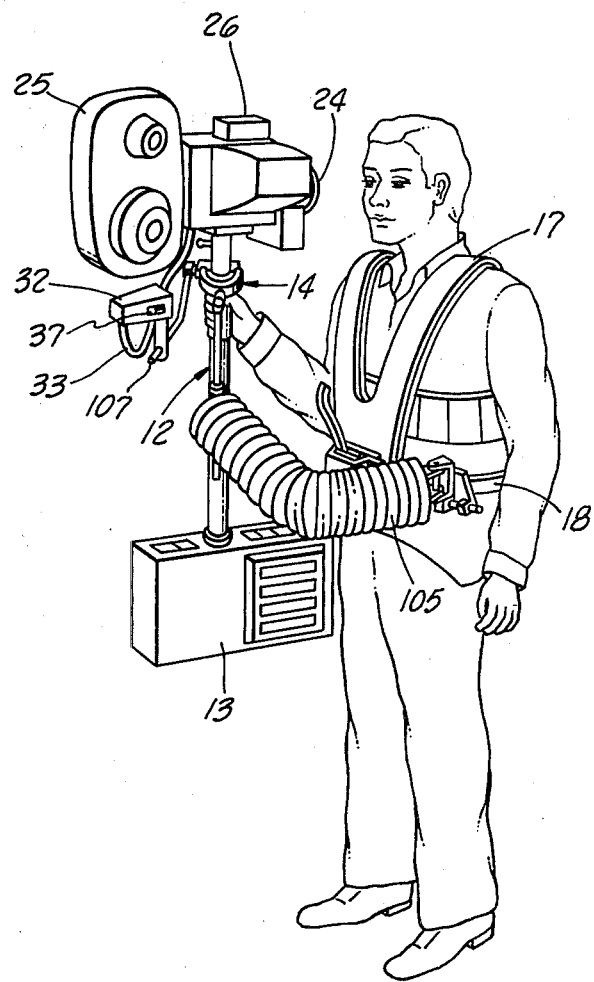
FIG. 10 is a view similar to FIG. 1, showing the camera operator photographing a scene behind him.

As best shown in FIG. 2, the camera base 21 is secured to the upper end of the camera support tube member 12 for two-axis adjustment in a horizontal plane. The adjusting screw 22 serves to move the camera 10 fore and aft and the adjusting screw 23 serves to move the camera from side to side. The weight of the camera and its internal motor, together with the weight of the camera lens 24, magazine 25 and video camera 26, can be centered over the axis of the camera support tube member 12.

The camera support tube member 12 is formed of two telescoping parts. The upper tube part 27 telescopically receives the lower part 28 by means of a spline joint connection 29 employing anti-friction rollers 30. The nut 28a clamps the split wedge ring 28b to secure the telescoping parts in selected position. The battery carrier 13 is fixed at the lower end of the lower tube part 28, and the same carrier 13 also contains electronic parts (not shown) used with the camera 10. A multiple conduit cable 31 within the camera support tube member 12 provides the necessary circuits between the battery, camera motor and electronic components.

The gimbal device 14 includes a ring 34 mounted to turn on the clamping sleeve 35. The sleeve 35 may be clamped at any desired position on the upper part 27 of the camera support tube 12. The ring 34 includes a pair of diametrically extending trunnions 36 pivotally received in the arms of a yoke 38 having an integral stem 39 extending at right angles to the axis of the aligned trunnions 36. The stem 39 is mounted to turn in socket member 40 fixed on the upper end of the upright rod 41. A bracket 42 is mounted to slide on the rod 41 and may be fixed in any desired position by means of the clamping screw 43.

The arm assembly 15 includes an end member 44 pivotally attached to the bracket 42 at 45. A pair of parallel links 46 and 47 are each pivotally connected to the end members 44 and 48. Thus, the link 46 is pivotally connected to the end member 44 at 50 and is pivotally connected to the end member 48 at 51. Similarly, the link 47 is pivotally connected to the end member 44 at 52 and is pivotally connected to end member 48 at 53. The construction of the arm assembly 16 is similar to that described for the arm assembly 15. Thus, the end members 54 and 55 are each pivotally connected by a pair of parallel links 56 and 57. The link 56 is pivotally connected to the end member 54 at 58 and is pivotally connected to the end member 55 at 59. The link 57 is pivotally connected to the end member 54 at 61 and is pivotally connected to the end member 55 at 62. The proportions of the parts forming the arm assembly 15 and the arm assembly 16 are such that the links and their pivotal connections to their respective end member form parallelograms.

The end member 48 of the arm assembly 15 is connected to the end member 54 of the arm assembly 16 by means of a pivot block 63 having spaced pivots 64 and spaced pivots 65. The pivot block 63 may be fixed to either the end member 48 or to the end member 54 by means of threaded fasteners 66, for the purpose described below.

The end member 55 is connected by aligned vertical pivots 67 to the adjustable support piece 68 pivotally mounted at 69 on the stationary strut 71. The adjusting screw 72 mounted to turn on the strut 71 engages a portion of the support piece 68 so that it may be swung through an arc in either direction about the axis of the pivot pin 69. The strut 71 is provided with a U-shaped terminal 73 at one end which may be secured on a mating block part 74 by means of a latch mechanism generally designated 75. The latch is operated by a lever 76 pivotally mounted on the part 74 and connected to project latch pins 77 laterally into receptacles provided in the U-shaped terminal 73. The block part 74 is connected by pivot pins 78 to the base plate 79 which, in turn, is fixed to the belt 18 directly in front of the cameraman. An adjusting screw 81 is connected to the base plate 79 and engages a portion 82 of the part 74 so that turning movement of the screw 81 serves to swing the part 74 about the axis of the pivot pin 78. From this description it will be understood that the strut 71 may be angularly adjusted about the horizontal axis of the pins 78 by means of the adjusting screw 81, and thereby adjust the position of the camera support tube 12 in space in a direction generally toward and away from the cameraman. The support piece 68 may be adjusted about another axis by means of the adjusting screw 72, and thereby adjust the position of the camera support tube 12 in a lateral direction.

Resilient means are provided for supporting and cushioning the weight of the parts carried on the gimbal device 14 and, as shown in the drawings, this means includes a pneumatic piston-and-cylinder assembly associated with each of the arm assemblies 15 and 16. Thus, the pneumatic assembly 83 has a piston portion 84 carrying a socket 85 which engages the ball 86 mounted on the link 46. The pneumatic assembly 83 also includes a cylinder 87 provided with a socket 88 which engages a ball 89 carried on the link 47. When the arm assembly 15 moves counterclockwise from the position shown in FIG. 5 with respect to the end member 48, the piston rod 84 moves back into the cylinder 87. A spring assembly generally designated 91 may also be employed in connection with the arm assembly 15. As best shown in FIG. 6, this spring assembly 91 includes a coil compression spring 92 encircling a tube 93 and engaging a shoulder 94 at one end. This shoulder is formed on one end of a spring enclosure 95 which abuts a washer 96 on the rod 97. The rod carries an end fitting 98 which forms a ball joint with the part 101 fixed to the link 47. The tube 93 is secured to the threaded sleeve 102 so that the axial position of the thrust bearing 104 may be adjusted relative to the tube 93. One end of the spring 92 engages the thrust bearing 104, so that the force of the spring 92 may be adjusted by means of the nut 103.

From the foregoing description it will be understood that the pneumatic cylinder assembly 83 provides a part of the force which supports the weight of the parts carried on the gimbal joint 14. This force may be supplemented by the force of the coil compression spring 92, the latter force being adjusted by means of the nut 103.

The construction of the arm assembly 16 may be substantially the same as that described in connection with the arm assembly 15.

If desired, a protective bellows device 105 may be provided to enclose the arm assemblies 15 and 16 as a safety measure, as well as to exclude dust and other foreign material.

The drawings show the body-mounted support device for camera in position for a right handed cameraman. In the event that the cameraman is left handed, certain of the parts may be connected in an alternate mode so that the strut 71 extends toward the right hip of the cameraman, instead of toward the left hip. As shown by the dot and dash lines in the upper portion of FIG. 3, the strut 71 may be installed on the mating block part 74 in an upside-down position with respect to the position shown in full lines. The strut 71 then extends toward the left, as viewed in FIG. 3, and may be latched in position by means of the latch lever 76. Also, the pivot block 63 which connects the arm assemblies 15 and 16 may be attached by fasteners 66 to the end member 54 instead of to the end member 48, as shown by the dot and dash lines at the lower right hand portion of FIG. 3. The pivotal connection between the end members 48 and 54 then occurs about the aligned pivots 65. The arm assemblies 15 and 16 then extend from right to left across and in front of the body of the cameraman, instead of from left to right, as shown in full lines in the drawings.

Figure 7:
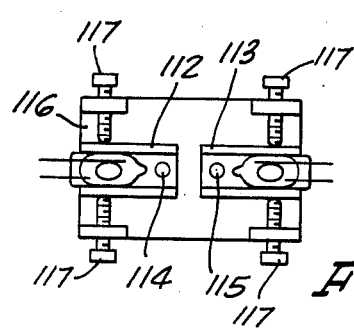
FIG. 7 is a diagram showing an electrical switch device for closing a signal circuit whenever the camera is tilted about its roll axis more than a predetermined amount.
Figure 8:
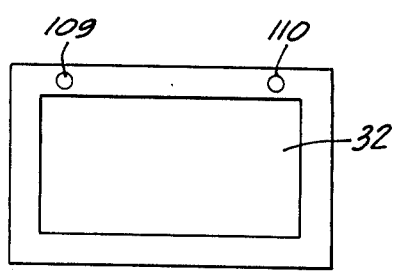
FIG. 8 is a diagram showing the viewing screen of the monitor and the two signal lamps which show excessive tilt of the camera.

The device shown in FIGS. 7 and 8 energizes signal lamps 109, 110 on the monitor 32 adjacent its screen 32 if the camera 10 should tilt about its roll axis to an excessive extent. Mercury switches 112, 113 are pivotally mounted at 114 and 115 on a support member 116 fixed to the camera assembly 10. Adjusting screws 117 fix the angularity of the switches and thereby fix the maximum tilt angle about the roll axis before the mercury closes an electric circuit. Excessive counterclockwise tilt causes the mercury switch 112 to energize the signal lamp 109, while excessive clockwise tilt of the mercury switch 113 energizes the signal lamp 110.

In operation, the body harness 17 with its belt 18 is secured in place on the cameraman or camera operator. The strut 71 is latched to the belt 18 and the height of the camera 10 with respect to the rod 41 is adjusted by means of the bracket 42 and clamping screw 43. The adjusting screw 22 (FIG. 2) is turned to bring the center of gravity of the camera 10 and associated parts into alignment with the axis of the camera support tube member 12. This fore and aft adjustment is used to compensate for different camera lenses 24 having different weights. Any necessary lateral adjustment is made by means of the adjusting screw 23. The cameraman places his hand on the grip collar 100 fixed on the camera support tube member 12. The weight of the motion picture camera assembly 10, film magazine 25, battery and battery carrier 13, and associated parts, is resiliently supported on the arms 15 and 16 and pneumatic piston-and-cylinder assemblies assisted by the adjustable springs 92. The entire weight is carried on the strut 71. Thus, the cameraman's hands are relieved of carrying this weight. The video camera 26 is secured to a portion of the motion picture camera assembly 10, while the monitor 32 is attached by an adjustable rod 107 to ring 34 by bracket 108, and electrically operated through cable 33. With his one hand on the grip collar 100 he controls the direction of the camera, turning it freely in any direction. His walking or running movements transmit very little unwanted movement to the camera assembly 10 which tends to "float" in space as he moves about. He may get down on his knees for a low angle shot, in which case the battery carrier 13 may be moved upward for ground clearance by telescoping the lower part 28 up into the upper part 27 of the camera support tube member 12.

Moving of the battery carrier 13 upward with respect to the gimbal device 14 has the effect of raising the center of gravity of all of the parts carried on the ring 34. This in turn decreases the force required from the hand of the operator to cause the camera assembly to tilt up or down about a transverse horizontal axis, or to tilt from side to side about a horizontal "roll" axis of the camera, or any combination of these motions. For maximum steadiness, the battery carrier 13 should be clamped in its lowermost position.

The video camera 26 moves with the camera assembly 10, but the video monitor 32 is mounted at 108 on the ring 34 which does not rotate. While the camera 10 may be turned in a panoramic movement in either direction from the position shown for more than 180 degrees, the video monitor 32 remains in front of the cameraman at all times. In this way, he may watch the monitor 32a regardless of the position of the camera 10. In the event that the cameraman should be moving forward while the camera 10 photographs the scene directly behind him, a switch 37 on the monitor 32 may be actuated to reverse the video picture from right to left. This is accomplished by conventional electronic circuitry. It provides the advantage that the cameraman views the monitor and sees the scene being photographed in its correct right-and-left aspects, rather than seeing it as a mirror image.

The latching device 75 operated by the latch lever 76 enables the cameraman to free himself from the entire device, should an emergency develop, such as, for example, falling into the water. Without this instant disconnect feature, the cameraman or camera operator might be dragged under the water by the weight of the entire assembly, and drowned.

In the modified form of the invention shown in FIG. 9, the strut 71 is not used, and instead a carrier 120 is fixed to the U-shaped terminal 73a. The support piece 68a is pivotally mounted on the carrier 120 in the same manner that the support piece 68a is pivotally mounted at 69 on the strut 71, as described above. An adjusting screw 72a is mounted on the carrier 120 and serves to tilt the support piece 68a in either direction with respect to the carrier 120. The tilt angle of the support piece 68a is thus adjustable in the same fashion as the tilt angle of the support piece 68 with respect to the strut 71, as described above. The aligned pivots 67 and the end member 55 are the same as that previously described. It will be understood that with this modification, the arm member 16 is pivotally mounted on the harness belt 18 directly in front of the cameraman, rather than off to one side. The camera assembly may then be guided by either the right hand or the left hand of the cameraman, and the lateral position of the arms may be adjusted by attaching the pivot block 63 to the end member 48 or the end member 54, as described above.

Having fully described our invention, it is to be understood that we are not to be limited by the details herein set forth but that our invention is of the full scope of the appended claims.

We claim:

1. In a body-mounted support device for a camera, the combination of: an upright support member, a motion picture camera and a video camera mounted on said member, a gimbal device carrying said member, a video monitor secured with respect to said gimbal device and electrically connected to said video, camera, said monitor having a display screen, electrical switch means mounted in fixed relation with respect to said motion picture camera, visual signal means carried by said video monitor and electrically connected to said switch means, said visual signal means comprising a pair of laterally spaced lamps adjacent said display screen, each lamp being energized by said electrical switch means upon tilting movement of the motion picture camera in one direction, respectively, about its roll axis, and means for adjusting said electrical switch means to change the degree of tilting required to energize said lamps.

2. In a body-mounted support device for a camera assembly, the combination of: an upright support member, a video camera mounted on said member, a gimbal device carrying said member, a video monitor secured with respect to said gimbal device and electrically connected to said video camera, said monitor having a display screen, electrical switch means mounted in fixed relation with respect to said camera assembly, visual signal means carried by said video monitor and electrically connected to said switch means, said visual signal means comprising a pair of laterally spaced lamps adjacent said display screen, each lamp being energized by said electrical switch means upon tilting movement of the camera assembly in one direction, respectively, about its roll axis, and means for adjusting said electrical switch means to change the degree of tilting required to energize said lamps.

3. In a body-mounted support device for a camera, the combination of: an upright support tube member comprising an upper tube and a lower tube, a gimbal device carrying said upper tube, means on said upper tube for supporting a motion picture camera and a video camera, means on the lower tube for supporting a battery carrier, means connecting said tubes for telescopic movement, whereby the distance between the cameras and the battery carrier may be changed, a video monitor secured with respect to said gimbal device and electrically connected to said video camera, said monitor having a display screen, electrical switch means mounted in fixed relation with respect to said motion picture camera, visual signal means carried by said video monitor and electrically connected to said switch means, said visual signal means comprising a pair of laterally spaced lamps adjacent said display screen, each lamp being energized by said electrical switch means upon tilting movement of the motion picture camera in one direction, respectively, about its roll axis.

4. In a motion picture camera assembly adapted to be supported by a cameraman, the combination of: a viewfinder device providing an image of the scene being photographed, electrical switch means mounted in fixed relation with respect to said motion picture camera assembly, visual signal means electrically connected to said switch means, said visual signal means comprising a pair of laterally spaced lamps positioned near said image, each lamp being energized by said electrical switch means upon tilting movement of the motion picture camera in one direction, respectively, about its roll axis, and means for adjusting said electrical switch means to change the degree of tilting required to energize said lamps.

5. In a motion picture camera assembly adapted to be supported by a cameraman, the combination of: a viewfinder device providing an image of the scene being photographed, said viewfinder device including a video camera secured relative to the motion picture camera, and including a video monitor having a display screen, means electrically connecting the video camera to the video monitor, electrical switch means mounted in fixed relation with respect to said motion picture camera, visual signal means electrically connected to said switch means, said visual signal means comprising a pair of laterally spaced lamps near said display screen, each lamp being energized by said electrical switch means upon tilting movement of the motion picture camera in one direction, respectively, about its roll axis, and means for adjusting said electrical switch means to change the degree of tilting required to energize said lamps.

6. In a body-mounted support device for a camera, the combination of: an upright support member, a motion picture camera and a video camera mounted on said member, a gimbal device carrying said member, a body harness adapted to be worn by a camera operator, a pair of serially connected articulated arm assemblies operatively interposed between said gimbal device and said body harness, resilient means associated with each of said arm assemblies for supporting the weight of the parts carried by said gimbal device, bearing means interposed between said gimbal device and said support member to permit turning movement of said cameras to photograph a scene behind the camera operator, a video monitor in front of the camera operator and secured with respect to said gimbal device, said monitor being electrically connected to said video camera, and switch operated circuitry for reversing the picture displayed on the monitor in a right-for-left fashion.

7. In a body-mounted support device for a camera, the combination of: an upright support member, a video camera mounted on said member, a gimbal device carried by said member, a body harness adapted to be worn by a camera operator, a pair of serially connected articulated arm assemblies operatively interposed between said gimbal device and said body harness, resilient means associated with each of said arm assemblies for supporting the weight of the parts carried by said gimbal device, bearing means interposed between said gimbal device and said support member to permit turning movement of said camera to photograph a scene behind the camera operator, a video monitor in front of the camera operator and secured with respect to said gimbal device, said monitor being electrically connected to said video camera, and switch operated circuitry for reversing the picture displayed on the monitor in a right-for-left fashion.

8. In a body-mounted support device for a camera, the combination of: an upright support tube member comprising an upper tube and a lower tube, a gimbal device carrying said upper tube, means on said upper tube for supporting a motion picture camera and a video camera, means on the lower tube for supporting a battery carrier, means connecting said tubes for telescopic movement, whereby the distance between the cameras and the battery carrier may be changed, a body harness adapted to be worn by a camera operator, a pair of serially connected articulated arm assemblies operatively interposed between said gimbal device and said body harness, resilient means associated with each of said arm assemblies for supporting the weight of the parts carried by said gimbal device, bearing means interposed between said gimbal device and said upper tube to permit turning movement of said cameras to photograph a scene behind the camera operator, a video monitor in front of the camera operator and secured with respect to said gimbal device, said monitor being electrically connected to said video camera, and switch operated circuitry for reversing the picture displayed on the monitor in a right-for-left fashion.

9. In a body mounted support device for a camera, the combination of: an upright support member, a camera mounted on said member, a gimbal device carrying said member, a body harness adapted to be worn by a camera operator, said body harness including a belt, a strut, means for releasably attaching said strut to said belt at a central forward position thereon so that a remote end of the strut may be located near either side of the camera operator, a first arm assembly pivotally supported on said remote end of the strut, a second arm assembly pivotally supported on the first arm assembly and carrying said gimbal device, and resilient means associated with each of said arm assemblies for supporting the weight of the parts carried by said gimbal device.

10. In a body-mounted support device for a motion picture camera, the combination of: an upright support tube member comprising an upper tube and a lower tube, a gimbal device carrying said upper tube, means on said upper tube for supporting a camera, means on the lower tube for supporting a battery carrier, means connecting said tubes for telescopic movement, whereby the distance between the camera and the battery carrier may be changed, a body harness adapted to be worn by a camera operator, said body harness including a belt, a strut, means for releasably attaching said strut to said belt at a central forward position thereon so that a remote end of the strut may be located near either side of the camera operator, a first arm assembly pivotally supported on said remote end of the strut, a second arm assembly pivotally supported on the first arm assembly and carrying said gimbal device, and resilient means associated with each of said arm assemblies for supporting the weight of the parts carried by said gimbal device.

* * * * *

UNITED STATES PATENT AND TRADEMARK OFFICE
CERTIFICATE OF CORRECTION

PATENT NO. : 4,158,490
DATED : June 19, 1979
INVENTOR(S) : Robert E. Gottschalk et al It is certified that error appears in the above-identified patent and that said Letters Patent are hereby corrected as shown below:

Column 4, line 61, "32" second occurrence should read -- 32a --.
Column 5, line 54, "screen" should be inserted after "monitor".

Column 6, line 35, delete comma after "video".

Signed and Sealed this

Twenty-fifth Day of September 1979

[SEAL]

Attest:

Attesting Officer

LUTRELLE F. PARKER
Acting Commissioner of Patents and Trademarks